United States Patent
Bouffier et al.

(10) Patent No.: US 11,724,591 B2
(45) Date of Patent: Aug. 15, 2023

(54) LIQUID CONTAINER AND METHOD FOR MANUFACTURING A LIQUID CONTAINER

(71) Applicant: KAUTEX TEXTRON GMBH & CO. KG, Bonn (DE)

(72) Inventors: Roman Bouffier, Koenigswinter (DE); Hartmut Wolf, Koenigswinter (DE); Christian Kopiec, Troisdorf (DE); Klaus Gebert, Willich (DE); Sebastian Stefan Rosenstraeter, Cologne (DE); Fabian Siggia, Cologne (DE); Markus Huetzen, Sankt Augustin (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 258 days.

(21) Appl. No.: 16/642,555

(22) PCT Filed: Aug. 24, 2018

(86) PCT No.: PCT/EP2018/072928
§ 371 (c)(1),
(2) Date: Feb. 27, 2020

(87) PCT Pub. No.: WO2019/042901
PCT Pub. Date: Mar. 7, 2019

(65) Prior Publication Data
US 2020/0384852 A1 Dec. 10, 2020

(30) Foreign Application Priority Data
Aug. 28, 2017 (DE) .................. 10 2017 119 707.9

(51) Int. Cl.
*B60K 15/03* (2006.01)
*B29C 65/16* (2006.01)
(Continued)

(52) U.S. Cl.
CPC .... *B60K 15/03177* (2013.01); *B29C 65/1635* (2013.01); *B29C 65/20* (2013.01);
(Continued)

(58) Field of Classification Search
CPC .... B60K 15/03177; B60K 2015/03046; B60K 2015/03059; B60K 2015/03493;
(Continued)

(56) References Cited

U.S. PATENT DOCUMENTS

| 4,405,557 A | 9/1983 | Lehnard |
| 4,529,100 A | 7/1985 | Ingemann |

(Continued)

FOREIGN PATENT DOCUMENTS

| CA | 1026516 | 2/1978 |
| CN | 101031446 | 9/2007 |

(Continued)

OTHER PUBLICATIONS

International Preliminary Report on Patentability, dated Mar. 12, 2020, received in corresponding PCT Application No. PCT/EP2018/072928.

(Continued)

*Primary Examiner* — Stephen J Castellano
(74) *Attorney, Agent, or Firm* — Grossman, Tucker, Perreault & Pfleger, PLLC

(57) ABSTRACT

A liquid container for a motor vehicle, having a first half-shell and a second half-shell, the half-shells delimiting a storage volume for accommodating liquid, the first half-shell having a first support layer and a first barrier layer, the second half-shell having a second support layer and a second barrier layer, the first barrier being situated on a side of the first support layer facing the storage volume, and the second barrier layer being situated on a side of the second support layer facing the storage volume.

12 Claims, 6 Drawing Sheets

(51) Int. Cl.
  *B29C 65/20* (2006.01)
  *B29C 65/00* (2006.01)
  *B32B 27/08* (2006.01)
  *B65D 65/40* (2006.01)
  *B29L 31/00* (2006.01)

(52) U.S. Cl.
  CPC .......... *B29C 66/1312* (2013.01); *B29C 66/54* (2013.01); *B29C 66/7234* (2013.01); *B32B 27/08* (2013.01); *B65D 65/40* (2013.01); *B29L 2031/7172* (2013.01); *B32B 2439/40* (2013.01); *B60K 2015/03046* (2013.01); *B60K 2015/03059* (2013.01); *B60K 2015/03493* (2013.01)

(58) Field of Classification Search
  CPC .......... B60K 2015/03065; B32B 27/08; B32B 2439/40; B65D 65/40
  See application file for complete search history.

(56) References Cited

U.S. PATENT DOCUMENTS

| | | | |
|---|---|---|---|
| 4,575,915 | A | 3/1986 | Clark et al. |
| 4,964,562 | A | 10/1990 | Gordon |
| 5,125,780 | A | 6/1992 | Budenbender |
| 5,129,544 | A | 7/1992 | Jacobson et al. |
| 7,211,307 | B2 | 5/2007 | Potter et al. |
| 7,572,492 | B2 | 8/2009 | Bager et al. |
| 9,073,245 | B2 | 7/2015 | Bocker et al. |
| 9,718,346 | B2 | 8/2017 | Karsch |
| 9,987,797 | B2 | 6/2018 | Karsch |
| 2002/0053566 | A1* | 5/2002 | Balzer .............. B60K 15/03177 220/4.13 |
| 2003/0209550 | A1 | 11/2003 | Potter et al. |
| 2005/0140052 | A1 | 6/2005 | Brandner et al. |
| 2006/0011173 | A1 | 1/2006 | Davis et al. |
| 2013/0239931 | A1* | 9/2013 | Kimoto .................. F02M 25/06 123/520 |
| 2015/0102026 | A1 | 4/2015 | Parola et al. |
| 2016/0243929 | A1 | 8/2016 | Karsch |
| 2018/0079576 | A1 | 3/2018 | Cassidy et al. |

FOREIGN PATENT DOCUMENTS

| | | | |
|---|---|---|---|
| CN | 102802914 | | 11/2012 |
| CN | 104955668 | | 9/2015 |
| CN | 106687386 | | 5/2017 |
| DE | 69203846 | | 11/1995 |
| DE | 19814298 | | 10/1999 |
| DE | 10327738 | | 2/2004 |
| DE | 102008020943 | | 10/2009 |
| DE | 102013004931 | | 9/2014 |
| DE | 102013018922 | | 5/2015 |
| EP | 0036967 | | 3/1981 |
| EP | 0383040 | | 1/1990 |
| EP | 0552468 | | 7/1993 |
| EP | 0888867 | | 1/1999 |
| EP | 3168075 | | 5/2017 |
| JP | S49134468 | | 12/1974 |
| JP | 56066396 | | 6/1981 |
| JP | 59179284 | | 10/1984 |
| JP | 05016938 | | 1/1993 |
| JP | 05104552 | | 4/1993 |
| JP | 10157738 | | 6/1998 |
| JP | 10157738 | A * | 6/1998 ....... B29C 66/12463 |
| JP | 2004098886 | | 4/2004 |
| JP | 2006321309 | | 11/2006 |
| JP | 2016132363 | | 7/2016 |

OTHER PUBLICATIONS

Office Action from related Japanese Appln. No. 2020-511883, dated Apr. 5, 2021. English translation attached.
Office Action from related Korean Appln. No. 10-2020-7008119, dated Mar. 10, 2021. English translation attached.
International Search Report, dated Nov. 13, 2018, received in corresponding PCT Application No. PCT/EP2018/072928.

* cited by examiner

LIQUID CONTAINER AND METHOD FOR MANUFACTURING A LIQUID CONTAINER

This application is the national stage (Rule 371) of international application No. PCT/EP2018/072928 filed 24 Aug. 2018.

FIELD

The present invention relates to a liquid container for a motor vehicle and a method for manufacturing a liquid container.

BACKGROUND

Recent motor vehicles contain numerous operating fluids such as fuel, urea solution for exhaust aftertreatment, and coolant. The liquids are accommodated in a respective liquid container. For example, plastic fuel containers are used for storing fuel.

Such plastic fuel containers should ideally be lightweight, crash-proof, and low in emissions. With regard to emissions, the increasingly stringent maximum allowable regulatory emission limits for evaporation of hydrocarbons from fuel into the environment must be observed. This requires the avoidance of fuel leaks under all operating conditions, for example during refueling, including refueling venting, during operational venting, i.e., the offgassing of fuel when the temperature of a tank system increases, and the diffusion of hydrocarbons through the container wall.

Known fuel containers have a diffusion barrier to keep the diffusion through the container wall low. If such a fuel container is formed by putting together two injection-molded half-shells, for example for each half-shell an exterior barrier layer may be situated on a support material in order to provide interior connecting elements or molded elements of the support material, possibly integrated during the injection molding, in the storage volume of the liquid container without penetrating the barrier layer. It is disadvantageous that the exterior barrier layer is exposed to mechanical stress, for example road stones or the like, and the barrier layer may be destroyed in some areas. This may result in increased diffusion-related emissions of a fuel, stored in the fuel container, to the surroundings.

Against this background, the technical object of the invention is to provide a liquid container and a method for manufacturing a liquid container which do not have, at least to an appreciable extent, the disadvantages described above, and which in particular allow reduced diffusion-related emissions from a liquid container.

SUMMARY

According to a first aspect, the invention relates to a liquid container for a motor vehicle, having a first half-shell and a second half-shell, the half-shells delimiting a storage volume for accommodating liquids, the first half-shell having a first support layer and a first barrier layer, the second half-shell having a second support layer and a second barrier layer, the first barrier being situated on a side of the first support layer facing the storage volume, and the second barrier layer being situated on a side of the second support layer facing the storage volume. Due to the interior arrangement of the barrier layers, they may be protected from mechanical stress, for example due to road stones or the like. Accordingly, the structural integrity of the barrier layers, compared to liquid containers having an exterior barrier layer, is not adversely affected by environmental influences. The barrier effect of the barrier layers, which acts against diffusion-related emissions of, for example, fuel stored in the liquid container, may be continually ensured in this way.

The liquid container may in particular be a plastic fuel container for a motor vehicle, which is configured for storing fuel for driving an internal combustion engine. The barrier layers and/or support layers are in particular suited for being in contact with diesel fuel or gasoline. The material of the barrier layer and the material of the support layer, with regard to their swelling properties, must therefore be suitable for being in direct contact with a liquid fuel. The support material as well as the barrier layer, with regard to their chemical resistance and swelling properties, must be suitable for use in direct contact with fuel.

The one-ply or multi-ply support layer may contain one or more of the following materials or may be made of one or more of the following materials: elastomer, thermoplastic elastomer, high-density polyethylene (HDPE), fiber-reinforced polyamide, polyamide (PA), partially aromatic polyamide, impact-resistant polyamide.

The one-ply or multi-ply barrier layer may contain one or more of the following materials or may be made of one or more of the following materials: ethylene vinyl alcohol copolymer (EVOH), low-density polyethylene (LDPE), polyether ether ketone (PEEK), polyamide (PA), partially aromatic polyamide, high-density polyethylene (HDPE), fluoropolymer. For example, the barrier layer may have a three-ply design made of PA and EVOH, with a central EVOH ply being covered or bordered on both sides by a PA cover layer. It is also possible, for example, to provide a six-ply wall structure or a five-ply structure made of HDPE, LDPE, and EVOH, with a central layer made of EVOH covered on both sides by an LDPE layer, and the LDPE layers in turn being covered by HDPE layers.

The first half-shell may be an upper shell of a plastic fuel container for a motor vehicle. The second half-shell may be a lower shell of the plastic fuel container.

The upper shell in the installed state faces the vehicle. The lower shell in the installed state faces away from the vehicle, i.e., faces the street or roadway.

It may be provided that the first barrier layer essentially completely covers the side of the first support layer facing the storage volume. Alternatively or additionally, it may be provided that the second barrier layer essentially completely covers the side of the second support layer facing the storage volume. Reliable encapsulation of a liquid stored in the liquid container may be achieved in this way.

According to another embodiment of the liquid container, it is provided that the half-shells in a connecting area are integrally joined together, with the first barrier layer in the connecting area being integrally joined to the second barrier layer, and that the first support layer and the second support layer in the connecting area are spaced apart from one another, with no contact between the first support layer and the second support layer, and the support layers bordering the barrier layers on both sides.

Due to the integral joining of the barrier layers, an essentially closed barrier bladder may be formed which essentially completely surrounds the storage volume of the liquid container, with the limitation that the mandatory tank connections such as the filling neck, vent, and/or withdrawal opening are provided. Diffusion-related emissions may be reliably limited in this way. When a reference is made herein that the barrier layers essentially completely surround the storage volume, this refers in particular to avoiding a permeation path in the connecting area between the half-shells, and it is understood that for filling the liquid container with fuel, for example, and for withdrawing the fuel from the liquid container, supply lines, outlets, and/or vent valves are provided, in whose vicinity the first or second barrier layer is locally penetrated. Accordingly, the wall of a half-shell may be provided with penetrating connection openings. The connection openings may have been produced in the injection molding process.

According to another embodiment of the liquid container, it is provided that at least one of the half-shells in the connecting area is made, at least partially, of a laser-transparent material, the integral bond having been formed by laser transmission welding.

It may be provided that the first support layer in the connecting area is made, at least partially, of a laser-transparent material. In this case, a laser beam generated by a laser welding device may penetrate the first support layer and be absorbed by the first barrier layer, for example, resulting in local melting of the first barrier layer and the second barrier layer and resulting in integral joining of same.

Alternatively, it may be provided that both the first support layer and the first barrier layer in the connecting area are made, at least partially, of a laser-transparent material. In this case, a laser beam generated by a laser welding device may penetrate the first support layer and the first barrier layer and be absorbed by the second barrier layer, which is thereby melted, so that an integral bond may be formed between the second barrier layer and the first barrier layer.

In other words, it may be provided that the first barrier layer may be made of a laser-transparent or a laser-impermeable material, while the first support layer is made of a laser-transparent material.

It may be provided that the second support layer is made of a laser-transparent material, and the second barrier layer may be made of a laser-transparent material or a non-laser-transparent material. It may be provided that both the first support layer and the second support layer are made of a laser-transparent material.

It may be provided that both support layers and a barrier layer are made of a laser-transparent material. For functioning of the process, it is only necessary for at least one of the barrier layers in the connecting area to be made of a non-laser-transparent, i.e., a laser-absorbing material, so that at least one of the barrier layers is suitable for the melting due to the energy input from the laser.

According to another embodiment of the liquid container, it is provided that the half-shells in a connecting area are integrally joined together, the first support layer in the connecting area being integrally joined to the second support layer, and that the first barrier layer and the second barrier layer in the connecting area are spaced apart from one another, with no contact between the first barrier layer and the second barrier layer, and wherein a solidified melt of a material of the first support layer and/or of a material of the second support layer is situated between the barrier layers.

For example, the first and second support layers may have been joined together by hot plate welding to achieve a cost-effective, durable integral bond.

It may be provided that the barrier layers in the connecting area are completely enclosed by the support layers and isolated from the surroundings by the support layers. The barrier layers may thus be protected from environmental influences.

It may be provided that a permeation path is formed in the connecting area between the spaced-apart barrier layers, and that a length of the permeation path, viewed in a cross section, is greater than or equal to twice the width of the permeation path, wherein the width of the permeation path corresponds to the distance between the barrier layers in the connecting area. For example, the diffusion-related emissions of a fuel along the permeation path may be held to a permissible level via the stated length-to-width ratio. The material of the support layers may be an HDPE, for example.

It may be provided that a length of the permeation path, viewed in a cross section, is greater than a wall thickness of the first half-shell and of the second half-shell.

According to another embodiment of the liquid container, it is provided that at least one of the half-shells in the connecting area has a web, wherein the integral bond is formed along the web. The web may in particular be seated in a form-fit manner in a receptacle of the respective other half-shell that has a complementary shape, at least in sections.

The web may be a circumferentially extending web. The web may be used to achieve a defined contact between the half-shells.

Both half-shells may have a circumferential web, which is used in each case to provide a defined contact between the half-shells, for example for a welding process.

The web or webs may be (a) laterally projecting weld collar(s).

It may be provided that at least one of the barrier layers is a one-ply film that has been integrally joined to the associated support layer in an injection molding process. For this purpose, the film may be accommodated in a mold half of an injection mold and molded on or back-molded with plasticized support material. An integral bond is formed between the barrier film and the support layer via the injection molding process. A half-shell having a support layer and a barrier film may thus be cost-effectively manufactured with low usage of material.

Alternatively or additionally, it may be provided that at least one of the barrier layers is a multi-ply film that has been integrally joined to the associated support layer in an injection molding process. Such a multi-ply film may be a five-ply film, for example, that contains a central layer made of ethylene vinyl alcohol copolymer (EVOH), and the EVOH layer is covered on both sides by a low-density polyethylene (LDPE) layer, and the LDPE layers are covered by high-density polyethylene (HDPE) layers.

The cover layers of a multi-ply film may in particular have the same design as the support material in order to achieve a reliable integral bond between the support material and the barrier film. The barrier effect of a multilayer film may thus be provided primarily by an EVOH layer, for example, while the LDPE layers are each used as an adhesion promoter for the exterior HDPE layers, and one of the HDPE layers may in turn may be provided with a support material for reliable adhesion or an integral bond, wherein the support material may likewise be made of the HDPE of the cover layers of the barrier film.

According to another embodiment of the liquid container, it is provided that a plastic that is used for attaching molded elements, connecting parts, or functional units is locally molded onto a side of at least one of the barrier layers facing the storage volume. For example, after the support layer is produced by injection molding, a support material may be locally molded onto the barrier layer, on a side of the barrier layer facing away from the support layer, by sequential injection molding. The locally molded-on plastic may be a pedestal or a plate-like element, for example, made of the support material, to which, for example, a surge tank may be welded or adhesively bonded. In this way, a functional unit may be situated in the area of a half-shell having an interior barrier layer, without penetrating or interrupting the barrier layer. The barrier effect of the particular barrier layer may thus be maintained, and in addition molded elements, connecting parts, or functional units may be situated in the area of the locally molded-on plastic of the half-shell.

The wall thickness of one of the support layers itself may be 2 mm to 6 mm, in particular 2 mm to 4 mm. This small wall thickness may be provided, for example, over 90% of the overall surface of a half-shell, wherein local reinforcing ribs, outlets, or other local thickened areas may be provided.

The thickness of one of the barrier layers, in particular barrier films, may be 100 μm to 1000 μm.

According to a second aspect, the invention relates to a method for manufacturing a liquid container, having the method steps:

injection molding of a first half-shell, the first half-shell having a first support layer and a first barrier layer, injection molding of a second half-shell, the second half-shell having a second support layer and a second barrier layer, joining the half-shells in such a way that the half-shells delimit a storage volume for accommodating liquid, the first barrier layer being situated on a side of the first support layer facing the storage volume, and the second barrier layer being situated on a side of the second support layer facing the storage volume.

By use of the method according to the invention, a liquid container may be manufactured in which the structural integrity of the barrier layers is protected from mechanical stress due to their interior configuration.

It may be provided that the half-shells are joined by welding the half-shells by laser transmission welding, wherein at least one of the half-shells in a connecting area is made, at least partially, of a laser-transparent material, wherein the half-shells in the connecting area integrally joined together, the first barrier layer in the connecting area being integrally joined to the second barrier layer, and wherein the first support layer and the second support layer in the connecting area are spaced apart from one another, with no contact between the first support layer and the second support layer, and the support layers bordering the barrier layers on both sides.

By use of the laser beam welding, a high-quality weld joint between the barrier layers may be quickly produced.

Alternatively, it may be provided that the half-shells are joined by hot plate welding, with the method steps:

heating and plasticizing at least one protrusion that is formed on a web of a support layer, using a hot plate pressing the half-shells together, with plasticized material of the protrusion being pressed between the barrier layers.

A reliable, cost-effective bond between support layers may be achieved by the hot plate welding.

In addition, during the pressing together of the half-shells, a sealing element may be placed against an end-face side of the web. The melt may be prevented from being laterally pressed out of the connecting area, between the half-shells, by use of the sealing element. The sealing element ensures that plasticized material of the protrusion reaches the area between the barrier layers in a targeted manner.

It may be provided that each of the half-shells has a circumferential web with at least one protrusion, wherein mutually facing protrusions of the two half-shells are plasticized before the half-shells are pressed together by means of the hot plate. The protrusions, viewed in a cross section and along a joining direction, may be offset relative to one another, or viewed in a cross section and along a joining direction may be aligned. The wall thickness of the material of the support layers situated between the barrier layers, and thus the distance between the barrier layers, may be adjusted by the dimensioning of the protrusions.

The protrusions as well as the webs may be circumferential.

BRIEF DESCRIPTION OF THE DRAWINGS

The invention is described in greater detail below with reference to the drawings, which schematically illustrate one exemplary embodiment, as follows.

DETAILED DESCRIPTION

Figure 1:
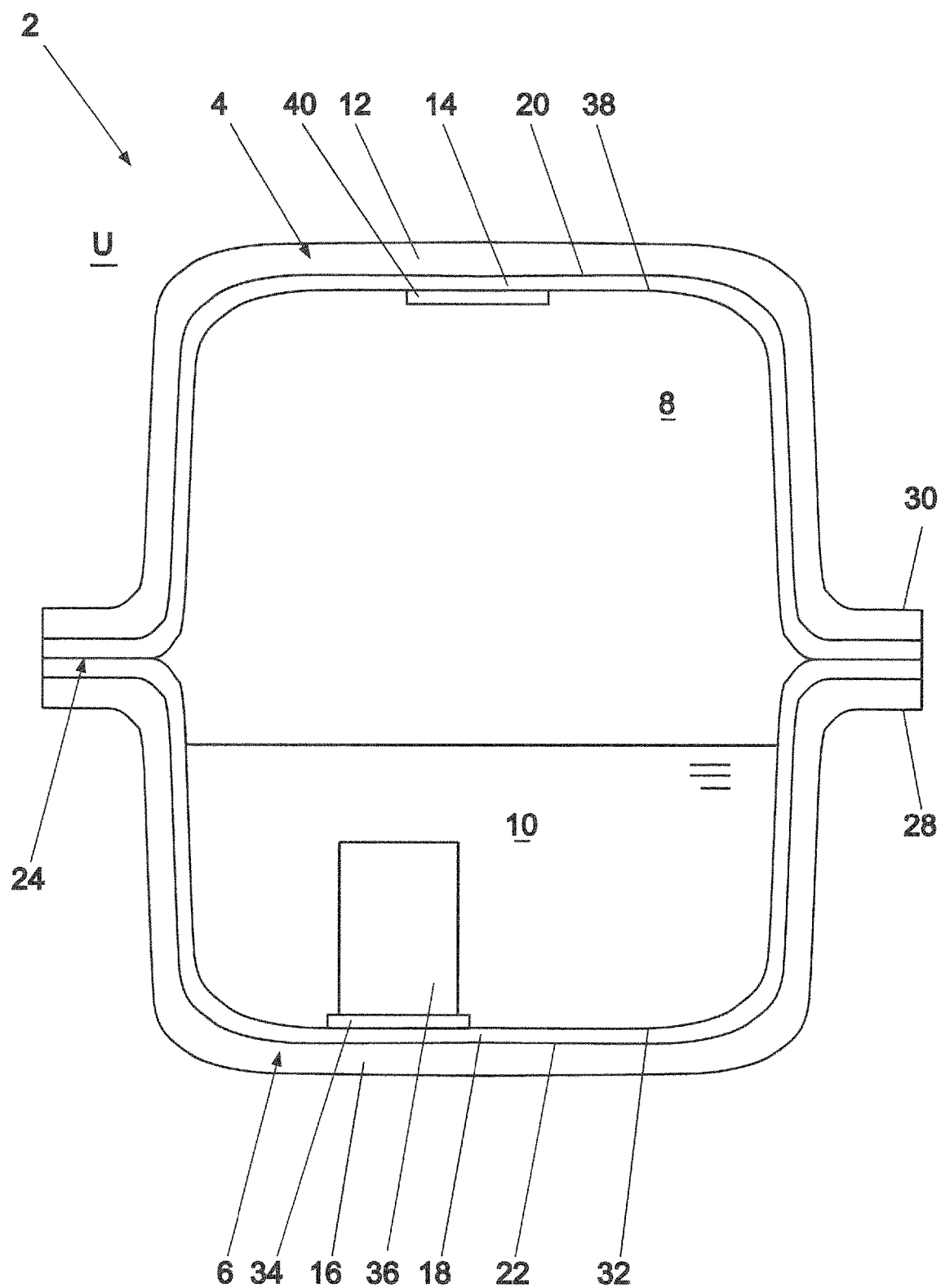
FIG. 1 shows a liquid container according to the invention in a cross section.

FIG. 1 shows a liquid container 2 according to the invention for a motor vehicle, in a cross section. The liquid container 2 has a first half-shell 4 and a second half-shell 6. The half-shells 4, 6 delimit a storage volume 8 for accommodating liquid 10.

In the present case the liquid container 2 is a plastic fuel container 2 for a motor vehicle. In the present case the liquid 10 is fuel 10 for driving an internal combustion engine.

The first half-shell 4 has a first support layer 12 and a first barrier layer 14. The second half-shell 6 has a second support layer 16 and a second barrier layer 18. The first barrier layer 14 is situated on a side 20 of the first support layer 12 facing the storage volume 8. The second barrier layer 18 is situated on a side 22 of the second support layer 16 facing the storage volume 8.

The first barrier layer 14 essentially completely covers the side 20 of the first support layer 12 facing the storage volume 8. The second barrier layer 18 essentially completely covers the side 22 of the second support layer 16 facing the storage volume 8.

The half-shells 4, 6 are integrally joined together in a connecting area 24. The first barrier layer 14 is integrally joined to the second barrier layer 18 in the connecting area 24.

The first support layer 12 and the second support layer 16 are spaced apart from one another in the connecting area 24, with no contact between the first support layer 12 and the second support layer 16, and the support layers 12, 16 bordering the barrier layers 14, 18 on both sides. It is understood that the connecting area 24 represents a fully circumferential, self-contained integral bond, so that the half-shells 4, 6 form an essentially closed tank bladder.

As mentioned above, the essentially closed tank bladder has mandatory inlets and outlets, not illustrated, for filling, withdrawing, and venting, in the vicinity of which a barrier layer is locally interrupted.

Figure 2:
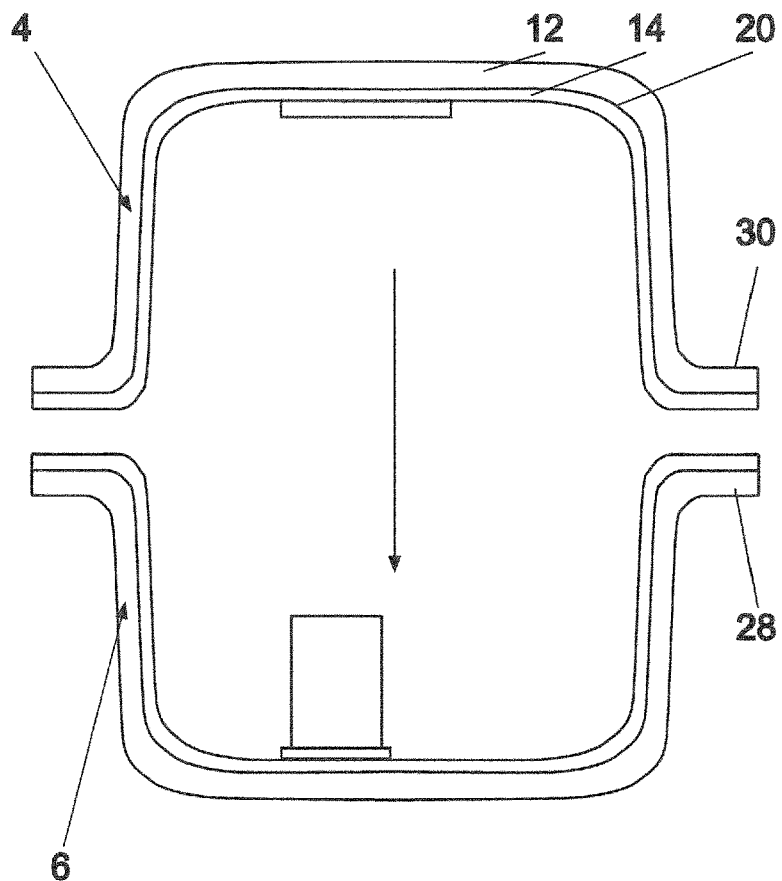
FIG. 2 shows the manufacture of the liquid container from FIG. 1.
Figure 2:
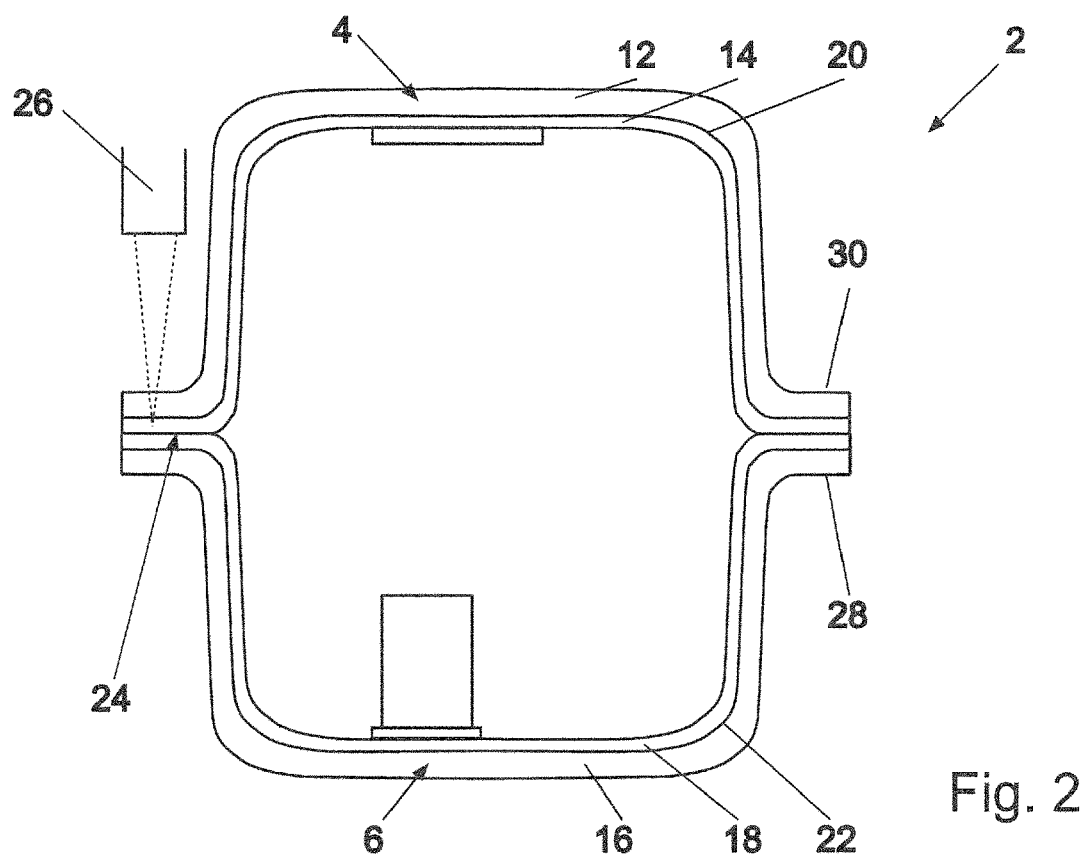

As is apparent from FIG. 2, the first half-shell 4 in the connecting area 24 is made, at least partially, of a laser-transparent material, wherein the integral bond between the half-shells 4, 6 has been established by laser transmission welding with the aid of a laser welding device 26.

In the present example, the first support layer 12 in the connecting area 24 is made, at least partially, of a laser-transparent material. According to further exemplary embodiments of the invention, it may be provided that the first support layer is made completely of laser-transparent material. According to further embodiments, it may likewise be provided that the first support layer and the first barrier layer in the connecting area are made, at least partially, of laser-transparent material.

The half-shells 4, 6 have a web 28, 30, respectively, in the connecting area 24. The integral bond between the barrier layers 14, 18 is formed along the webs 28, 30. The webs 28, 30 are circumferential webs 28, 30, each extending with a lateral protrusion in order to provide a defined contact between the half-shells 4, 6 to form a weld joint. The webs 28, 30 may be referred to as weld collars 28, 30.

In the present case the barrier layers 14, 18 are one-ply films that have been integrally joined to the associated support layer 12, 16 in the injection molding process. According to further exemplary embodiments of the invention, it may be provided that at least one barrier film, in particular both barrier films, has/have a multi-ply design, and, for example, may have a five-ply wall structure with a central EVOH layer, two LDPE layers that cover the EVOH layer, and two HDPE layers that cover the LDPE layers.

A plastic 34 that is used for attaching a surge tank 36 has been locally molded onto a side 32 of the barrier layer 18 facing the storage volume 8. The plastic 34 forms a pedestal 34 to which the surge tank 36 has been welded. The surge tank 36 has thus been integrated into the storage volume 8 without adversely affecting the structural integrity of the barrier layer 18.

Similarly, a plastic 40 that is used for attaching molded elements, connecting parts, or functional units has been molded onto a side 38 of the barrier layer 14 facing the storage volume 8.

Figure 3:
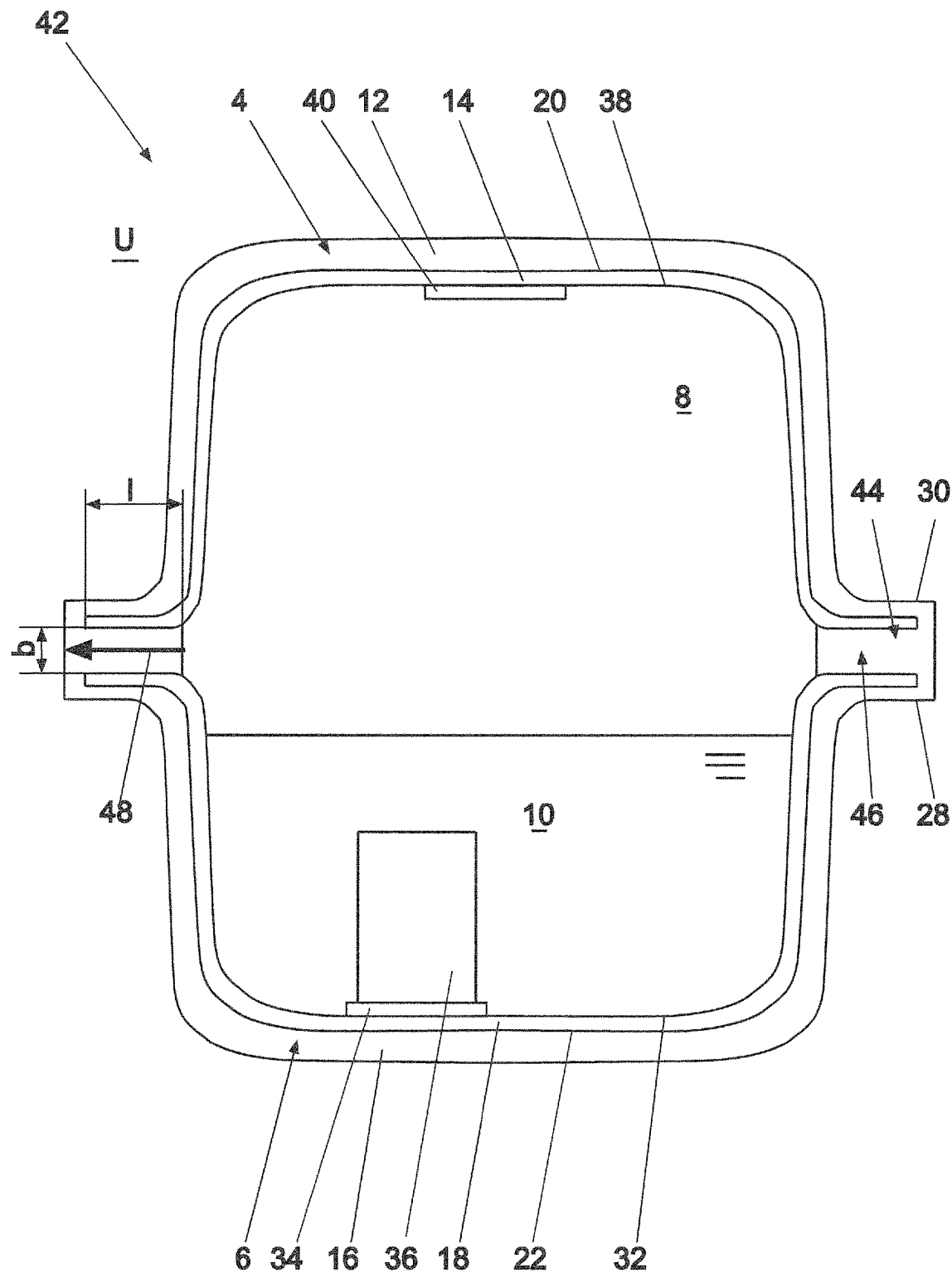
FIG. 3 shows another liquid container according to the invention in a cross section.

FIG. 3 shows another embodiment of a liquid container 42 according to the invention, in a cross section. To avoid repetition, in comparison to the above-described exemplary embodiments, identical features are assigned the same reference numerals.

The liquid container 42 differs from the liquid container 2 in that the half-shells 4, 6 in a connecting area 44 are integrally joined together, the first support layer 12 in the connecting area 44 being integrally joined to the second support layer 16.

The first barrier layer 14 and the second barrier layer 18 are spaced apart from one another in the connecting area, with no contact between the first barrier layer 14 and the second barrier layer 18. A solidified melt 46 of a material of the first support layer 12 and of the second support layer 16 is situated between the barrier layers 14, 18. It is understood that this results in local mixing of the material of the first support layer 14 and of the second support layer 16 in the connecting area 44.

In the connecting area 44, the barrier layers 14, 18 are completely enclosed by the support layers 12, 16 and isolated from the surroundings U by the support layers 12, 16. A width b of a permeation path 48 corresponds to the distance between the barrier layers 14, 18. Viewed in the cross section in the present case, a length l of the permeation path 48 is more than twice the width b of the permeation path 48.

Figure 4:
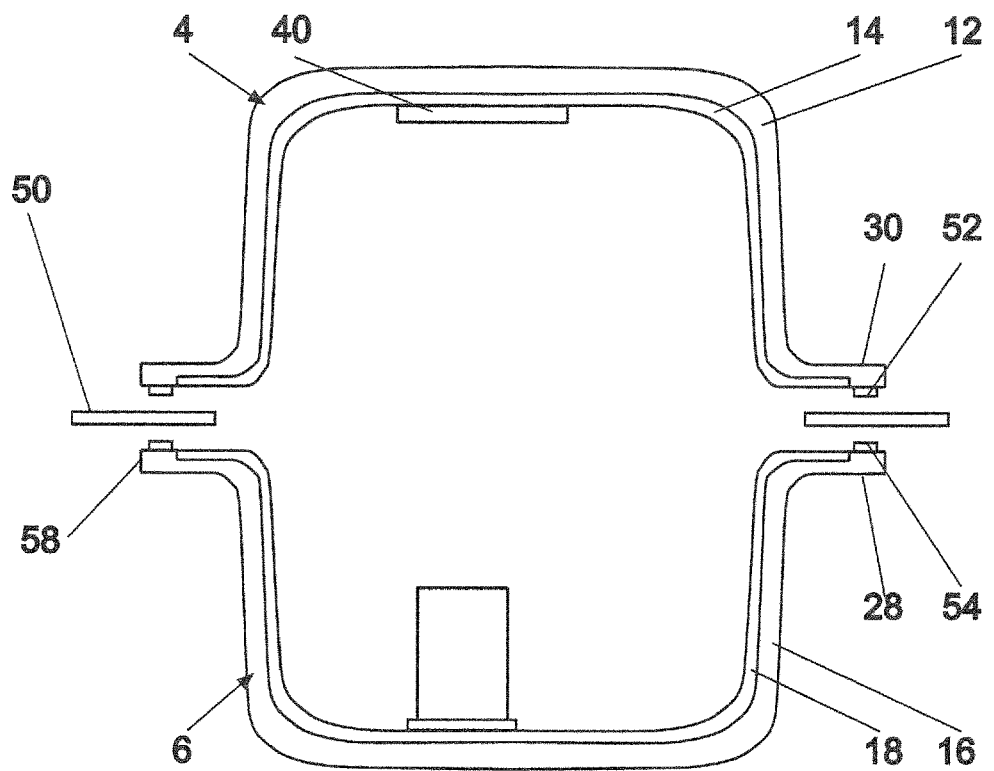
FIG. 4 shows the manufacture of the liquid container from FIG. 3.
Figure 4:
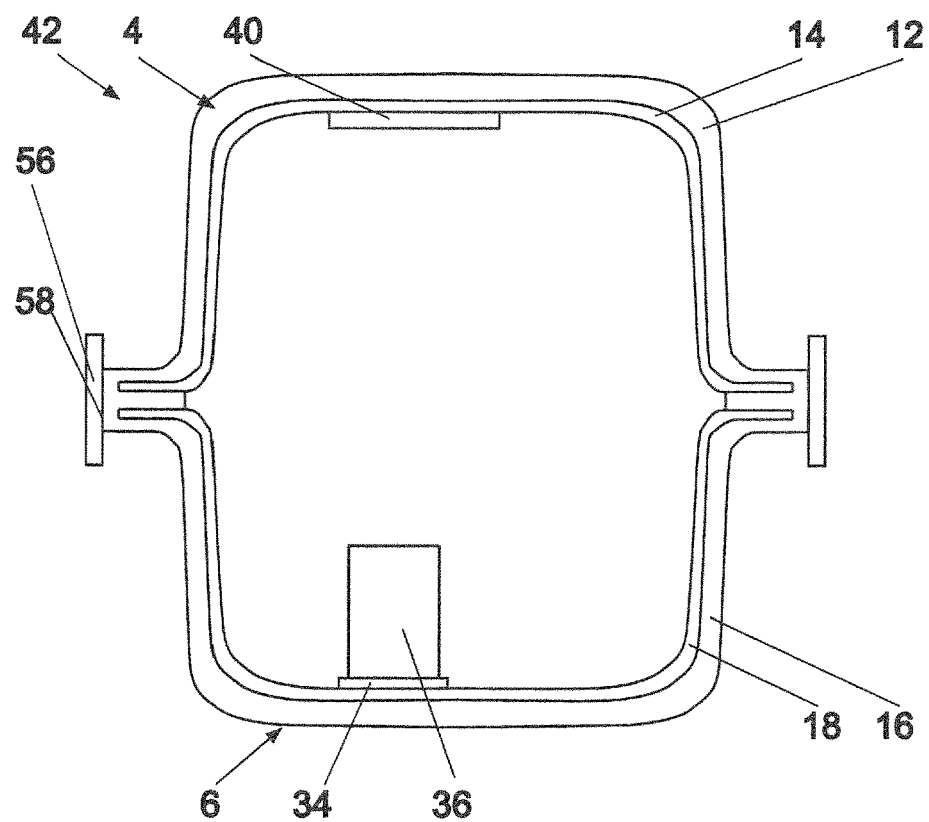

As is apparent from FIG. 4, the liquid container 42 has been manufactured by hot plate welding. For this purpose, the half-shells 4 and 6 provided in the injection molding have been initially heated in the connecting area 44 by means of a hot plate 50.

For this purpose, protrusions 52, 54 formed in particular on the webs 28, 30 have been plasticized. In a next step the half-shells 4, 6 have been pressed together, with plasticized material of the protrusions 52, 54 being pressed between the barrier layers 14, 18. During the pressing together of the half-shells 4, 6, a sealing element 56 is placed against an end-face side 58 of the webs 28, 30.

Figure 5:
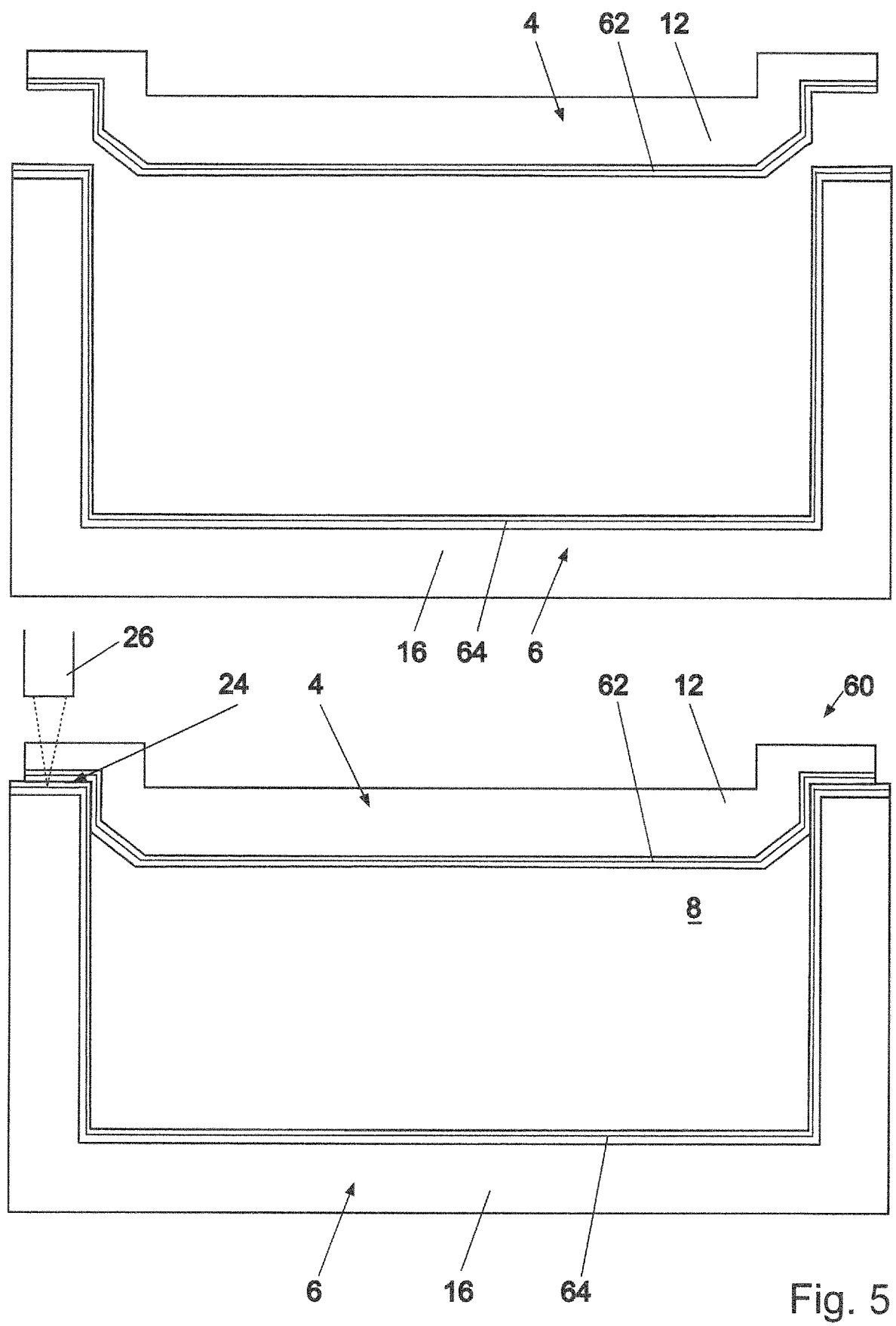
FIG. 5 shows another liquid container according to the invention in a cross section and its manufacture.

FIG. 5 shows another variant of a liquid container 60 according to the invention. The liquid container 60 differs from the above-described exemplary embodiments by virtue of the asymmetrical design of the first half-shell 4 compared to the second half-shell 6. In the present case the first half-shell 4 forms a cover of the second half-shell 6.

In addition, a first barrier layer 62 and a second barrier layer 64 having a five-ply structure are provided. The first barrier layer 62 has a central layer made of EVOH, which is covered on both sides by adhesion promoter layers made of LDPE. The LDPE layers are in turn bordered on both sides by HDPE layers.

The five-ply barrier film 62 formed in this way has been integrally joined to the first support layer 12 in the injection molding process. The first support layer 12 is likewise made of an HDPE, the integral bond being the same between the first support layer 12 and the first barrier layer 62.

As illustrated in the top part of FIG. 5, the first half-shell 4 and the second half-shell 6 are initially provided separately. In a second step the first half-shell 4 and the second half-shell 6 are pressed together and integrally joined by means of a laser welding device 26, as discussed above with reference to FIG. 2.

Also as in the example in FIG. 2, the first support layer 12 and the second support layer 16 of the liquid container 60 are spaced apart from one another in the connecting area 24. Therefore, there is no direct contact between the first support layer 12 and the second support layer 16.

The first barrier layer 14 and the second barrier layer 18 form an essentially closed barrier bladder around the storage volume 8, with the previously discussed limitations for any inlets and outlets for fluid streams.

Figure 6:
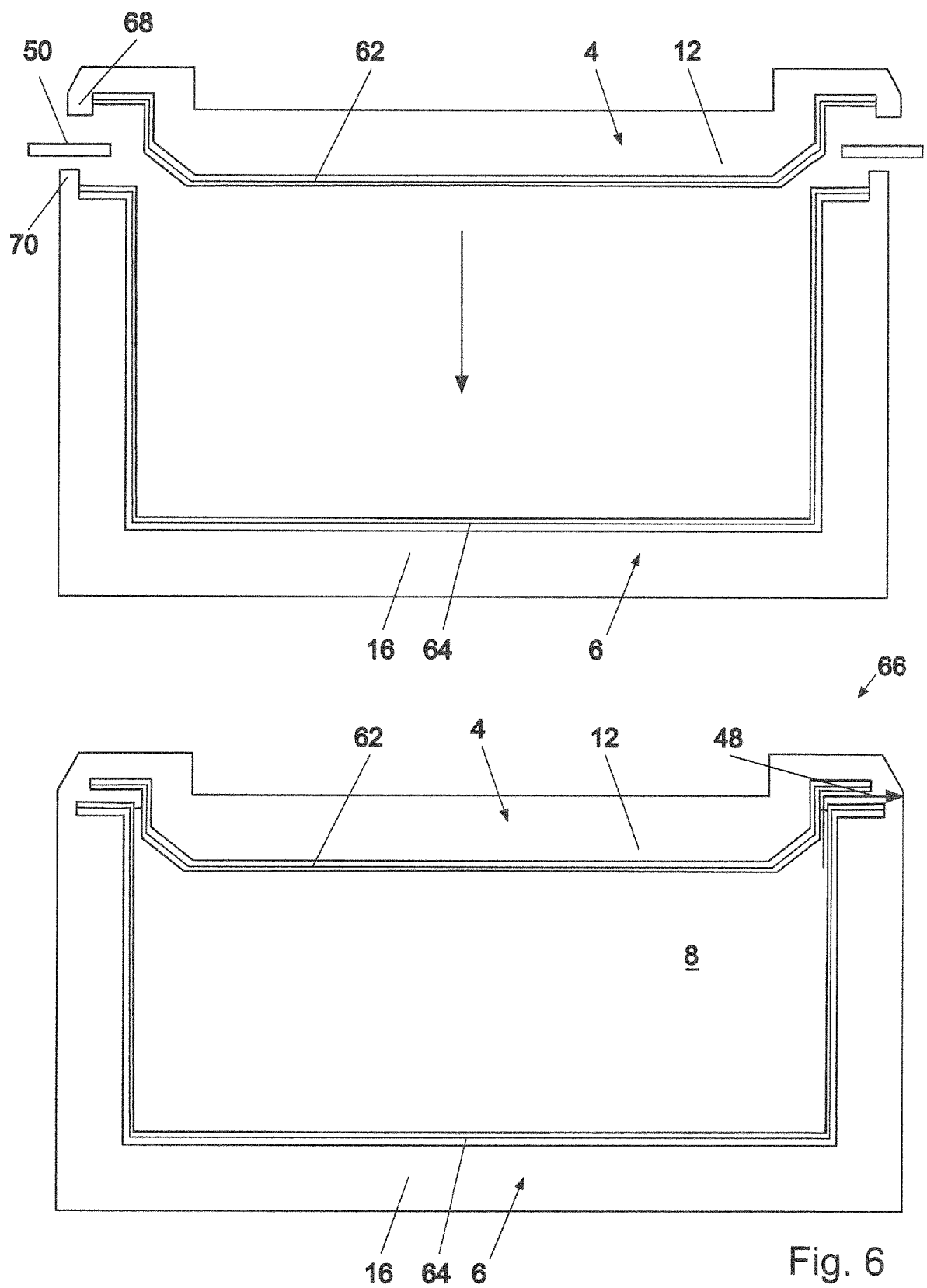
FIG. 6 shows another liquid container according to the invention in a cross section and its manufacture.

FIG. 6 shows another variant of a liquid container 66 according to the invention. In this exemplary embodiment the first half-shell 4 and the second half-shell 6 have an asymmetrical design, with the first half-shell forming a cover of the second half-shell 6.

The first half-shell 4 and the second half-shell 6 have been welded together by hot plate welding by means of a hot plate 50, analogously to the exemplary embodiment discussed for FIG. 4.

For this purpose, local protrusions 68, 70 of the half-shells 4, 6, respectively, have been plasticized by means of the hot plate. The hot plate 50 has been subsequently removed and the half-shells 4, 6 pressed together, with plasticized material of the protrusions 68, 70 being pressed between multi-ply barrier layers 62, 64. The barrier layers 62, 64 are thus spaced apart from one another, with no direct contact between the barrier layers 62, 64. A permeation path 48 is thus formed between the barrier layers 62, 64, analogously to FIG. 3.

LIST OF REFERENCE SYMBOLS 2 liquid container
4 first half-shell
6 [second] half-shell
8 storage volume
10 liquid
12 first support layer
14 first barrier layer
16 second support layer
18 second barrier layer
10 side
22 side
24 connecting area
26 laser welding device
28 web/weld collar
30 web/weld collar
32 side
34 plastic/pedestal
36 surge tank
38 side
40 plastic
42 liquid container
44 connecting area
46 solidified melt
48 permeation path
50 hot plate
52 protrusion
54 protrusion
56 sealing element
58 end-face side
60 liquid container
62 first barrier layer
64 second barrier layer
66 liquid container
68 protrusion
70 protrusion
l length
b width
U surroundings

What is claimed is:

1. A liquid container for a motor vehicle comprising:
a first half-shell; and
a second half-shell;
wherein the half-shells delimit a storage volume for accommodating liquid;
wherein the first half-shell has a first support layer and a first barrier layer;
wherein the second half-shell has a second support layer and a second barrier layer;
wherein the first barrier layer is situated on a side of the first support layer facing the storage volume;
wherein the second barrier layer is situated on a side of the second support layer facing the storage volume;
wherein the half-shells in a connecting area are directly integrally joined together, the first barrier layer in the connecting area being directly integrally joined to the second barrier layer;
wherein the first support layer and the second support layer in the connecting area are spaced apart from one another, with no contact between the first support layer and the second support layer, and the support layers bordering the barrier layers on both sides; and
wherein a plastic that is used for attaching molded elements, connecting parts, or functional units is locally molded onto a side of at least one of the barrier layers facing the storage volume.

2. The liquid container according to claim 1, wherein:
the first barrier layer in the connecting area being directly integrally bonded to the second barrier layer.

3. The liquid container according to claim 1, wherein at least one of the half-shells in the connecting area is made, at least partially, of a laser-transparent material, a direct integral bond having been formed by laser transmission welding.

4. The liquid container according to claim 3, wherein:
the first support layer in the connecting area is made, at least partially, of a laser-transparent material, or
the first support layer and the first barrier layer in the connecting area are made, at least partially, of a laser-transparent material.

5. The liquid container according to claim 1, wherein:
at least one of the half-shells in the connecting area has a web; and
wherein a direct integral bond is formed along the web.

6. The liquid container according to claim 1, wherein:
at least one of the barrier layers is a one-ply film that has been directly integrally bonded to the associated support layer; and/or
at least one of the barrier layers is a multi-ply film that has been directly integrally bonded to the associated support layer.

7. A liquid container for a motor vehicle comprising:
a first half-shell; and
a second half-shell;
wherein the half-shells delimit a storage volume for accommodating liquid;
wherein the first half-shell has a first support layer and a first barrier layer;
wherein the second half-shell has a second support layer and a second barrier layer;
wherein the first barrier layer is situated on a side of the first support layer facing the storage volume;
wherein the second barrier layer is situated on a side of the second support layer facing the storage volume;
wherein the half-shells in a connecting area are integrally joined together, the first support layer in the connecting area being integrally joined to the second support layer;
wherein the first barrier layer and the second barrier layer in the connecting area are spaced apart from one another, with no contact between the first barrier layer and the second barrier layer;
wherein solidified melt of a material of the first support layer and/or of a material of the second support layer is situated between the barrier layers;
wherein a permeation path is formed in the connecting area between the spaced-apart barrier layers;
wherein a length of the permeation path, viewed in a cross section, is greater than or equal to twice the width of the permeation path; and
wherein the width of the permeation path corresponds to the distance between the barrier layers in the connecting area.

8. The liquid container according to claim 7, wherein:
the first support layer in the connecting area being integrally bonded to the second support layer.

9. The liquid container according to claim 7, wherein the barrier layers in the connecting area are completely enclosed by the support layers and isolated from the surroundings by the support layers.

10. The liquid container according to claim 7, wherein:
at least one of the half-shells in the connecting area has a web; and
wherein an integral bond is formed along the web.

11. The liquid container according to claim 7, wherein:
at least one of the barrier layers is a one-ply film that has been integrally bonded to the associated support layer; and/or
at least one of the barrier layers is a multi-ply film that has been integrally bonded to the associated support layer.

12. The liquid container according to claim 7, wherein a plastic that is used for attaching molded elements, connecting parts, or functional units is locally molded onto a side of at least one of the barrier layers facing the storage volume.

* * * * *